US007469692B2

(12) United States Patent
Dea et al.

(10) Patent No.: US 7,469,692 B2
(45) Date of Patent: Dec. 30, 2008

(54) EXHAUST GAS RECIRCULATION SYSTEM

(75) Inventors: Kevin Dea, Washington, IL (US); James Durand, Dunlap, IL (US); Evan Jacobson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 32 days.

(21) Appl. No.: 11/647,386

(22) Filed: Dec. 29, 2006

(65) Prior Publication Data

US 2008/0162018 A1 Jul. 3, 2008

(51) Int. Cl.

| | |
|---|---|
| ***F02M 25/07*** | (2006.01) |
| ***F02B 47/08*** | (2006.01) |
| ***F02B 29/04*** | (2006.01) |
| ***G06F 19/00*** | (2006.01) |
| *F02B 33/44* | (2006.01) |

(52) U.S. Cl. ............................ 123/568.21; 123/568.12; 123/563; 60/599; 60/605.2; 701/108

(58) Field of Classification Search ................. 123/563, 123/568.11, 568.12, 568.16, 568.2, 568.21; 701/103, 108, 110, 114; 60/599, 605.2; 73/117.3, 118.1

See application file for complete search history.

(56) References Cited

U.S. PATENT DOCUMENTS

| | | | | |
|---|---|---|---|---|
| 5,155,833 | A | 10/1992 | Cullison et al. | |
| 5,508,926 | A | 4/1996 | Wade | |
| 5,732,688 | A * | 3/1998 | Charlton et al. | 123/568.12 |
| 5,918,582 | A * | 7/1999 | Itoyama et al. | 123/568.29 |
| 6,112,729 | A | 9/2000 | Barnes et al. | |
| 6,227,182 | B1 | 5/2001 | Muraki et al. | |
| 6,230,697 | B1 * | 5/2001 | Itoyama et al. | 123/568.21 |
| 6,298,835 | B1 | 10/2001 | Horie et al. | |
| 6,378,515 | B1 | 4/2002 | Geyer | |
| 6,401,700 | B2 | 6/2002 | Balekai et al. | |
| 6,415,776 | B1 | 7/2002 | Gates et al. | |
| 6,457,461 | B1 * | 10/2002 | Romzek | 123/568.16 |
| 6,502,563 | B2 * | 1/2003 | Itoyama | 123/568.21 |
| 6,742,335 | B2 | 6/2004 | Beck et al. | |
| 6,866,030 | B1 | 3/2005 | Sun et al. | |
| 6,868,824 | B2 | 3/2005 | Yang et al. | |

(Continued)

FOREIGN PATENT DOCUMENTS

| | | |
|---|---|---|
| EP | 0 648 925 | 4/1995 |

(Continued)

*Primary Examiner*—Willis R Wolfe, Jr.
(74) *Attorney, Agent, or Firm*—Finnegan, Henderson, Farabow, Garrett & Dunner

(57) ABSTRACT

A power system including an exhaust producing engine, an exhaust system and an exhaust gas recirculation (EGR) system is provided. The EGR system may include an EGR flowpath and an air intake system. The EGR system may also include an EGR valve configured to regulate the flow of exhaust gases through the EGR flowpath. The power system may also include a monitoring system configured to monitor operating parameters of at least two components of the EGR system. The power system may also include a controller configured to determine, based on the monitored operating parameters, a maximum flowrate value for each of the components. Each of the maximum flowrate values may represent the maximum EGR flowrate for that component. The controller may be configured to control the EGR valve, based on the maximum flowrate values, to result in an EGR flowrate no greater than the lowest of the maximum flowrate values.

20 Claims, 3 Drawing Sheets

U.S. PATENT DOCUMENTS

| | | | |
|---|---|---|---|
| 6,935,320 | B2 | 8/2005 | Veinotte |
| 6,957,642 | B2 | 10/2005 | Miura |
| 6,973,785 | B2 | 12/2005 | Umehara et al. |
| 7,055,508 | B2 | 6/2006 | Matsunaga et al. |
| 7,089,738 | B1 * | 8/2006 | Boewe et al. .............. 60/605.2 |
| 2002/0023619 | A1 | 2/2002 | Janak et al. |
| 2002/0170546 | A1 * | 11/2002 | Itoyama ................. 123/568.27 |
| 2003/0136390 | A1 | 7/2003 | Ramamurthy et al. |
| 2003/0192516 | A1 | 10/2003 | Brunemann et al. |
| 2005/0066659 | A1 | 3/2005 | Super et al. |
| 2006/0185364 | A1 | 8/2006 | Chalgren et al. |

FOREIGN PATENT DOCUMENTS

| | | | | |
|---|---|---|---|---|
| EP | 0 820 560 | | 6/2002 | |
| EP | 1 375 876 | | 1/2004 | |
| EP | 1528249 | | 5/2005 | |
| GB | 2 204 915 | | 11/1988 | |
| JP | 10196464 | A * | 7/1998 | ............ 123/568.12 |
| JP | 2004011562 | A * | 1/2004 | ................ 60/605.2 |

* cited by examiner

EXHAUST GAS RECIRCULATION SYSTEM

TECHNICAL FIELD

The present disclosure is directed to an exhaust gas recirculation (EGR) system and, more particularly to an EGR system that employs EGR flow rates that are determined based on the operating limits of other components affected by EGR flow rate.

BACKGROUND

EGR systems are employed by internal combustion engines to help reduce various engine emissions. A typical EGR system may include a conduit, or other structure, fluidly connecting some portion of the exhaust path of an engine with some portion of the air intake system of the engine to thereby form an EGR path. Different amounts of exhaust gas recirculation may be desirable under different engine operating conditions. In order to regulate the amount of exhaust gas recirculation, such systems typically employ an EGR valve that is disposed at some point in the EGR path.

Systems have been developed to control EGR flow by regulating the amount of exhaust gases that are recirculated under various operating conditions, e.g., by controlling the position of an EGR valve. Some systems include an actuator for opening and closing the EGR valve, wherein the actuator is controlled by software-implemented control logic. Depending on the operating conditions of the engine, the control logic may position the EGR valve to allow varying amounts of exhaust gases to be recirculated.

While larger amounts of exhaust gas recirculation (i.e., higher EGR flow rates) may, under certain engine operating conditions, reduce emissions, various components may be affected by the EGR flow rate and, as such, may be taxed beyond their operating limits if EGR flow rates get too high. Exemplary components and/or engine operating parameters that can be affected by EGR flow rate may include turbo chargers, engine temperature, exhaust temperature, exhaust pressure, catalytic converters, particulate traps, air-to-air after coolers (ATAAC), EGR coolers, etc. In addition, condensation of gases in the air intake track of the engine may also become problematic at higher EGR flow rates.

EGR systems have been developed that are configured to monitor one or more operating conditions of engines and vary the amount of exhaust gas recirculation based on these monitored conditions. For example, U.S. Pat. No. 6,868,824, issued to Yang et al. ("the '824 patent"), discloses a system configured to control EGR flow rate based on parameters such as exhaust pressure, exhaust temperature, and turbo speed. However, the system of the '824 patent does not control the EGR flow rate based on monitored operating parameters related to the EGR system itself, such as air-to-air after cooler (ATAAC) inlet temperature, EGR cooler inlet temperature, or levels of condensation of gases in the air intake track of the engine. Therefore, none of these components are directly protected by the EGR control system. Although, in some circumstances, limiting EGR flow rate based on other parameters may protect one or more of these components, without directly monitoring the operating parameters of the EGR system components, it is possible for these components to be taxed beyond their operating limits without detection. Further, the system of the '824 patent does not determine maximum EGR flow rates for each of the monitored components under various operating conditions and control EGR flow rate to prevent exceeding the lowest of the determined maximum EGR flow rates.

The present disclosure is directed at solving one or more of the problems discussed above.

SUMMARY OF THE INVENTION

In one aspect, the present disclosure is directed to a power system. The power system may include an exhaust producing engine, an exhaust system configured to direct exhaust gases produced by the engine away from the engine, and an exhaust gas recirculation system. The exhaust gas recirculation system may include an exhaust gas recirculation flowpath and an air intake system of the engine, wherein the exhaust gas recirculation flowpath is configured to route a portion of exhaust gases produced by the engine back to the air intake system. The exhaust gas recirculation system may also include an exhaust gas recirculation valve configured to regulate the flow of exhaust gases through the exhaust gas recirculation flowpath. The power system may also include a controller and a monitoring system configured to monitor operating parameters of at least two components of the exhaust gas recirculation system. The controller may be configured to determine, based on the monitored operating parameters, a maximum flowrate value for each of the at least two components of the exhaust gas recirculation system. Each of the maximum flowrate values may represent the maximum exhaust gas recirculation flowrate that may be utilized without exceeding a predetermined operating limit of the monitored component with which the respective maximum flowrate value is associated. The controller may also be configured to control the exhaust gas recirculation valve, based on the determined maximum flowrate values, to result in an exhaust gas recirculation flowrate no greater than the lowest of the determined maximum flowrate values.

In another aspect, the present disclosure is directed to an exemplary method for exhaust gas recirculation. The method may include directing exhaust gases produced by an engine away from the engine with an exhaust system. The engine may be part of a power system including the engine, the exhaust system, and an EGR system. The EGR system may include an exhaust gas recirculation flowpath, an air intake system of the engine, wherein the exhaust gas recirculation flowpath is configured to route a portion of exhaust gases produced by the engine back to the air intake system, and an exhaust gas recirculation valve configured to regulate the flow of exhaust gases through the exhaust gas recirculation flowpath. The power system may also include a monitoring system and a controller. The method may further include recirculating, with the exhaust gas recirculation system, a portion of exhaust gases produced by the engine back to the air intake system via the exhaust gas recirculation flowpath. In addition, the method may include regulating, with the exhaust gas recirculation valve, the flow of exhaust gases through the exhaust gas recirculation flowpath. Also, the method may include monitoring, with the monitoring system, operating parameters of at least two components of the exhaust gas recirculation system. The method may also include determining, with the controller, a maximum flowrate value for each of the at least two components of the exhaust gas recirculation system, based on the monitored operating parameters. Each of the maximum flowrate values may represent the maximum exhaust gas recirculation flowrate which may be utilized without exceeding a predetermined operating limit of the monitored component with which the respective maximum flowrate value is associated. The method may further include controlling, with the controller, the exhaust gas recirculation valve, based on the determined maximum flowrate values, to result in an exhaust gas recirculation flowrate no greater than the lowest of the determined maximum flowrate values.

DETAILED DESCRIPTION

Reference will now be made in detail to exemplary embodiments and illustrations. Wherever possible, the same reference numbers will be used throughout the drawings to refer to the same or like parts. While specific configurations and arrangements are discussed, it should be understood that this is done for illustrative purposes only.

Figure 1:
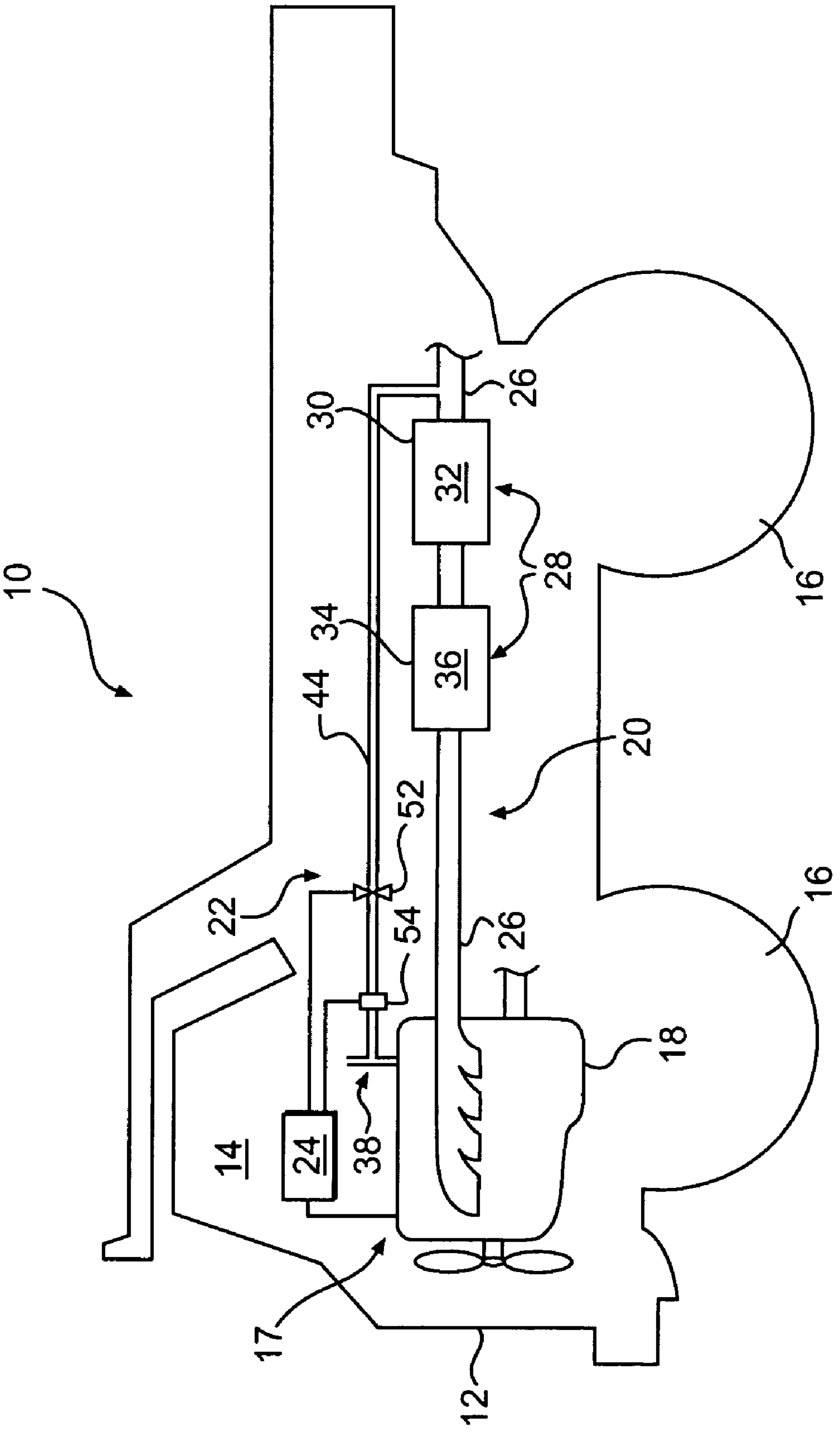
FIG. 1 is a diagrammatic illustration of a machine including a power system according to an exemplary disclosed embodiment.

FIG. 1 illustrates a machine 10 including a frame 12, an operator station 14, one or more traction devices 16, and a power system 17, which may include an engine 18 and an exhaust system 20, which may include an exhaust gas recirculation system (EGR system) 22. Although machine 10 is shown as a truck, machine 10 could be any type of mobile or stationary machine having an exhaust producing engine. In the case of a mobile machine, traction devices 16 may be any type of traction devices, such as, for example, wheels, as shown in FIG. 1, tracks, belts, or any combinations thereof.

Engine 18 may be connected to frame 12 and may include any kind of engine that produces an exhaust flow of exhaust gases. For example, engine 18 may be an internal combustion engine, such as a gasoline engine, a diesel engine, a gaseous-fuel burning engine or any other exhaust gas producing engine. Engine 18 may be naturally aspirated or, in other embodiments, may utilize forced induction (e.g., turbocharging or supercharging).

Power system 17 may include a controller 24. Controller 24 may include any means for receiving machine operating parameter-related information and/or for monitoring, recording, storing, indexing, processing, and/or communicating such information. These means may include components such as, for example, a memory, one or more data storage devices, a central processing unit, and/or any other components that may be used to run an application.

Although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, and/or other forms of RAM or ROM. Various other known circuits may be associated with controller 24, such as power supply circuitry, signal-conditioning circuitry, solenoid driver circuitry, communication circuitry, and other appropriate circuitry.

Controller 24 may be configured to perform multiple processing and controlling functions. For example, in some embodiments, controller 24 may be configured for engine management (e.g., controller 24 may include an engine control module, a.k.a. an ECM). Alternatively or additionally, controller 24 may be configured for monitoring/calculating various parameters related to exhaust output and after-treatment thereof. In some embodiments, machine 10 may include multiple controllers (a configuration not shown), each dedicated to perform one or more of these or other functions. Such multiple controllers may be configured to communicate with one another.

Exhaust system 20 may include an exhaust conduit 26 and one or more after-treatment devices 28. After-treatment devices 28 may include a catalyst-based device 30 (e.g., a catalytic converter). Catalyst-based device 30 may include a catalyst 32 configured to convert (e.g., via oxidation or reduction) one or more gaseous constituents of the exhaust stream produced by engine 18 to a more environmentally friendly gas and/or compound to be discharged into the atmosphere. For example, catalyst 32 may be configured to chemically alter at least one component of the exhaust flow. Catalyst-based device 30 may be configured for one or more various types of conversion, such as, for example, selective catalytic reduction (SCR), diesel oxidation (e.g., a diesel oxidation catalyst, DOC), and/or adsorption of nitrous oxides ($NO_x$; e.g., a $NO_x$ adsorber).

After-treatment devices 28 may also include a particulate trap 34. Particulate trap 34 may include any type of after-treatment device configured to remove one or more types of particulate matter, such as soot and/or ash, from an exhaust flow of engine 18. Particulate trap 34 may include a filter medium 36 configured to trap the particulate matter as the exhaust flows through it. Filter medium 36 may consist of a mesh-like material, a porous ceramic material (e.g., cordierite), or any other material and/or configuration suitable for trapping particulate matter.

In some embodiments, after-treatment devices 28 may include combinations of these types of devices. For example, after-treatment devices 28 may include one or more catalytic particulate traps (not shown), which may include a catalytic material integral with filter medium 36. For example, catalyst 32 may be packaged with, coated on, or otherwise associated with filter medium 36. In some embodiments, filter medium 36 may, itself, be a catalytic material. In addition, although exhaust system 20 is shown with a single catalyst-based device 30 and a single particulate trap 34, exhaust system 20 may include more than one of either or both. In other embodiments, exhaust system 20 may include more than one catalytic particulate trap. Such multiple after-treatment devices and/or multiple sets of after-treatment devices may be positioned in series (e.g., along exhaust conduit 26) or in parallel (e.g., in dual exhaust conduits; an embodiment not shown). In some embodiments, catalyst-based device 30 may be positioned downstream from particulate trap 34, as shown in FIG. 1. In other embodiments (not shown), catalyst-based device 30 may be positioned upstream from particulate trap 34. Other embodiments may include catalysts both upstream and downstream from particulate trap 34.

Exhaust system 20 may be configured to route exhaust gases produced by engine 18 away from engine 18 via exhaust conduit 26, which may be configured to direct the exhaust flow from engine 18 to particulate trap 34, to catalyst-based device 30, and ultimately release the exhaust flow to the atmosphere. It should be noted that FIG. 1 is not intended to accurately represent the relative sizes and proportions of machine 10 or the components of EGR system 22. For example, catalyst-based device 30 and/or particulate trap 34 may be located substantially closer to engine 18 than illustrated in FIG. 1. In addition, catalyst-based device 30 and/or particulate trap 34 may be substantially smaller relative to engine 18 than illustrated in FIG. 1.

Figure 2:
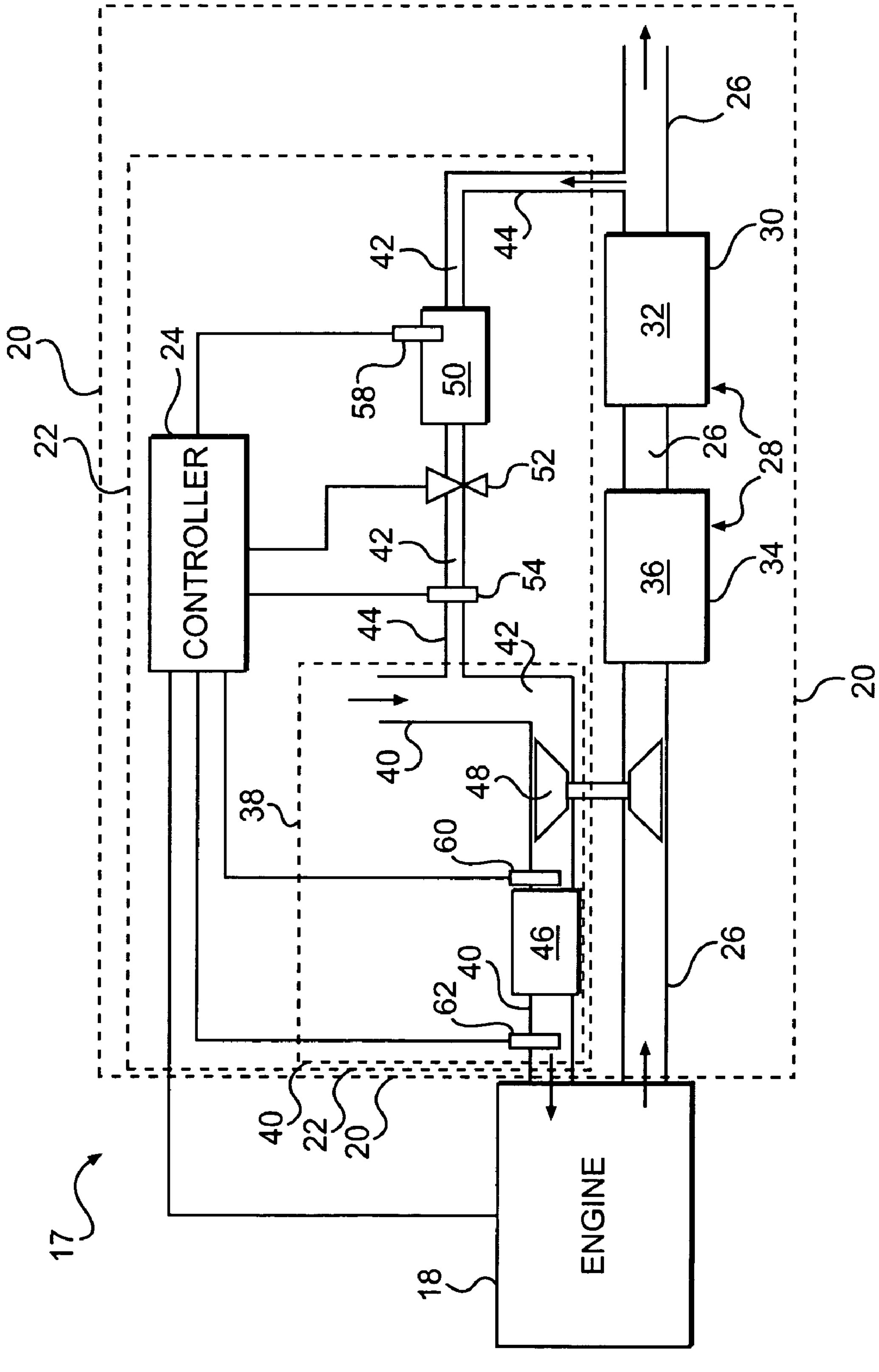
FIG. 2 is a diagrammatic illustration of a power system according to an exemplary disclosed embodiment.

FIG. 2 illustrates power system 17 and sub-systems thereof in greater detail. Although FIG. 2 illustrates a particular configuration of EGR system 22, the positioning of the components of EGR system 22 relative to one another may vary from that depicted in FIG. 2. EGR system 22 may include an air intake system 38 of engine 18. Air intake system 38 may include an intake track 40. EGR system 22 may include an exhaust gas recirculation flowpath (EGR flowpath) 42 configured to route a portion of exhaust gases from exhaust conduit 26 back to engine 18. EGR flowpath 42 may include an EGR conduit 44 and portions of air intake track 40.

Air intake system 38 may further include an air-to-air after cooler (ATAAC) 46. ATAAC 46 may be configured to cool air in air intake system 38 prior to induction into engine 18. ATAAC 46 may be positioned at any location along intake track 44 downstream from a forced induction compressor unit 48. Although FIG. 2 shows compressor unit 48 to be part of a turbo charger, power system 17 could alternatively include a supercharger. In other embodiments, engine 18 may be naturally aspirated, in which case, power system 17 would not include any forced induction compressor unit.

EGR system 22 may include an exhaust gas recirculation cooler (EGR cooler) 50. EGR cooler 50 may be positioned at any location along EGR flowpath 42, and may be configured to cool exhaust gases flowing therethrough. EGR system 22 may also include an exhaust gas recirculation valve (EGR valve) 52 configured to regulate the flow of exhaust gases through EGR flowpath 42. EGR valve 52 may be any type of valve configured to open or close off EGR flowpath 42, such that the position of EGR valve 52 (valve position) determines the flowrate through EGR flowpath 42 (EGR flowrate). EGR valve 52 may include a flapper valve (e.g., a throttle-type butterfly valve) or any other suitable type of valve. In some embodiments, EGR valve 52 may be operated via servo control or any suitable actuation mechanism. Although shown on EGR conduit 44, in some embodiments, EGR valve 52 may be located at the junction between EGR conduit 44 and air intake track 40. In some embodiments, EGR valve 52 may be controllable to allow varying EGR flowrates and/or selectively completely block EGR flow.

In some embodiments, EGR flowpath 42 may be configured to divert a portion of the exhaust gases from exhaust system 20 from a location upstream from one or both of after-treatment devices 28. However, it should be noted that it may be advantageous to divert the exhaust gases from exhaust system 20 from a location downstream from one or both of after-treatment devices 28, as shown in FIG. 1, because such gases will be cleaner than untreated gases upstream from after-treatment devices 28. These cleaner gases may have less potential to damage or otherwise cause problems with various components of EGR system 22 (e.g., ATAAC 46, compressor unit 48, EGR cooler 50, EGR valve 52, intercoolers (not shown), etc.) and/or various components of engine 18 (e.g., engine internals).

Other factors, such as, for example, engine speed, turbo boost pressure, etc. may influence the EGR flowrate as well. EGR system 22 may be configured to control EGR flowrate despite these other influential factors. For example, EGR system 22 may include an exhaust gas recirculation flow detection device (EGR flow detection device) 54 configured to determine EGR flowrate. During operation, EGR valve 52 may be controlled based, at least in part, on measurements of EGR flowrate taken by flow detection device 54.

Flow detection device 54 may include any type of device configured to measure the flow of gases in EGR flowpath 42. For example, flow detection device 54 may include a mass flow sensor or any other suitable flow detection device.

Figure 3:
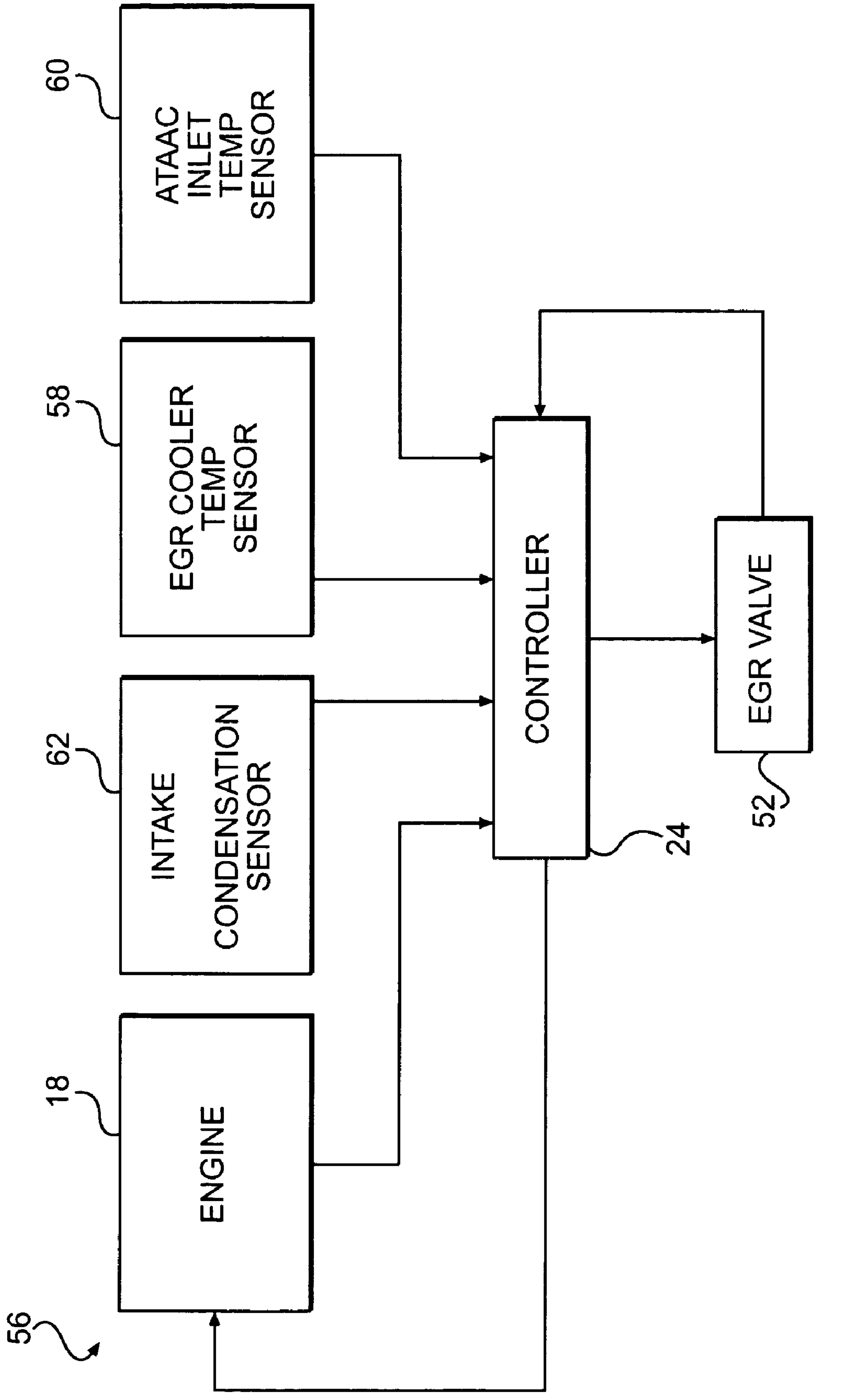
FIG. 3 is a schematic representation of a monitoring system according to an exemplary disclosed embodiment.

As illustrated in FIG. 3, power system 17 may include a monitoring system 56 configured to monitor operating parameters of at least two components of exhaust gas recirculation system 38 (components of monitoring system 56 are also depicted in FIG. 2). Monitoring system 56 may be configured to monitor such parameters as the thermal load on EGR cooler 50, inlet temperature of ATAAC 46, and/or the amount of condensation of gases in EGR flowpath 42. Alternatively or additionally, monitoring system 56 may be configured to monitor one or more other operating parameters of power system 17.

Monitoring system 56 may collect data regarding the monitored components in "real-time." For purposes of this disclosure, the term "real-time" shall refer to the immediate or substantially immediate availability of data to an information system as a transaction or event occurs. That is, data may be retrieved and available for analysis as quickly as it can be transmitted from the data collecting devices to controller 24. Such transmissions may be virtually instantaneous or may take a few seconds or minutes to complete. Such monitoring may enable controller 24 to respond in a precise manner to maintain operating parameters within predetermined limits and/or to desired specifications.

In some embodiments, one or more of the monitored operating parameters may be determined indirectly based on measurements of other operating parameters of power system 17. For example, some embodiments, temperatures, pressures, condensation, etc. at various locations in exhaust system 20 and/or EGR system 22 may be determined indirectly by, for example, thermodynamic modeling using data collected regarding other operating parameters of power system 17. Such modeling may be referred to as a "virtual sensor." Alternatively or additionally, in some embodiments, one or more of the monitored operating parameters may be measured directly, e.g., with an actual temperature, pressure, or moisture sensor.

Monitoring system 56 may be configured to assess thermal load on EGR cooler 50. For purposes of this disclosure, thermal load is defined as an assessment of the amount of thermal energy carried by the exhaust gas recirculation relative to the cooling capacity of the exhaust gas recirculation cooler. For example, thermal load may include an assessment of the amount of heat which may be carried by the exhaust gases flowing through EGR cooler 50 (which may be determined based on the temperature, pressure, composition, and flowrate of gases in EGR conduit 44) relative to the cooling capacity of the coolant flowing through EGR cooler 50 (which may be determined based on the temperature, composition, and flowrate of such coolant through EGR cooler 50).

Monitoring system 56 may include an EGR cooler temperature sensor 58, which may be integral with, or adjacent to, EGR cooler 50, as shown in FIG. 2. In some embodiments, temperature sensor 58 may be situated in close proximity to flow detection device 54. In other embodiments, temperature sensor 58 may be a virtual sensor as described above.

Monitoring system 56 may also include an ATAAC inlet temperature sensor 60, configured to measure ATAAC inlet temperature. In one embodiment, ATAAC inlet temperature sensor 60 may be integral with ATAAC 46 (an embodiment not shown). Alternatively, ATAAC inlet temperature sensor 60 may be positioned slightly upstream from ATAAC 46, as shown in FIG. 2, or in any other location suitable to facilitate measurement of ATAAC inlet temperature. In other embodiments, ATAAC inlet temperature sensor 60 may be a virtual sensor.

EGR system 22 may also include a condensation sensor 62, configured to measure the amount of condensation in EGR flowpath 42. In some embodiments, condensation may be monitored in intake track 40. Although condensation sensor 62 is shown closer to engine 18 than ATAAC 46 and other components of intake system 38, condensation sensor 62 may be positioned at any location along EGR flowpath 42. In other embodiments, condensation sensor 62 may be a virtual sensor.

The operation of EGR valve 52 may be controlled by controller 24. In some embodiments, controller 24 may be configured to control EGR valve 52 to prevent damage to components of power system 17, such as EGR cooler 50, ATAAC 46, air intake system 38, etc. In some embodiments, controller 24 may be configured to determine, based on the monitored operating parameters, a maximum flowrate value for each of at least two monitored components of EGR system 22. The determination of the maximum flowrate value for each of the components of EGR system 22 may take into consideration other power system operating conditions, such as engine speed, coolant temperature, exhaust temperature, etc. For example, controller 24 may be configured to determine, for each component, a maximum EGR flowrate value for a given set of operating conditions of power system 17. Each of the determined maximum flowrate values may represent the maximum EGR flowrate that may be utilized, under the given power system operating conditions, without exceeding a predetermined operating limit of the monitored component with which the respective maximum flowrate value is associated. For instance, controller 24 may be configured to determine the maximum EGR flowrate that could be used, given a particular engine speed, coolant temperature, and/or exhaust temperature, without resulting in thermal load that exceeds the operating limits of EGR cooler 50. Controller 24 may also be configured to control EGR valve 52, based on the determined maximum flowrate values, to result in an EGR flowrate no greater than the lowest of the determined maximum flowrate values.

This control strategy for EGR system 22 may prevent the thermal load on EGR cooler 50 and the temperature of ATAAC 46 from reaching levels that could damage these components or other components of power system 17. Further, this control strategy may prevent the level of condensation in EGR system 22 from reaching levels that could result in damage to various components of power system 17.

INDUSTRIAL APPLICABILITY

The disclosed EGR system 22 may be suitable to enhance exhaust emissions control for engines. EGR system 22 may be used for any application of an engine. Such applications may include supplying power for machines, including, for example, stationary equipment such as power generation sets, or mobile equipment, such as vehicles. EGR system 22 may be used for any kind of vehicle, such as, for example, automobiles, construction machines (including those for on-road, as well as off-road use), and other heavy equipment.

Not only may the EGR system 22 be applicable to various applications of an engine, but EGR system 22 may be applicable to various types of engines as well. For example, EGR system 22 may be applicable to any exhaust producing engine, which may include gasoline engines, diesel engines, gaseous-fuel driven engines, hydrogen engines, etc. EGR system 22 may also be applicable to a variety of engine configurations, including various cylinder configurations, such as "V" cylinder configurations (e.g., V6, V8, V12, etc.), inline cylinder configurations, and horizontally opposed cylinder configurations. EGR system 22 may also be applicable to engines with a variety of induction types. For example, EGR system 22 may be applicable to normally aspirated engines, as well as those with forced induction (e.g., turbocharging or supercharging). Engines to which EGR system 22 may be applicable may include combinations of these configurations (e.g., a turbocharged, inline-6 cylinder, diesel engine).

In order to ensure that the various components of the disclosed EGR system do not exceed their respective operating limits, the disclosed power system may be configured to monitor one or more operating parameters of such components. For example, the disclosed power system may monitor air-to-air after cooler (ATAAC) inlet temperature, EGR cooler temperature, condensation of gases in the EGR system, etc. Such monitoring may involve collecting real-time data (i.e., data collected during operation of the engine and utilized as it is collected). The disclosed power system may regulate EGR flow rate (e.g., with an EGR valve) based on engine and exhaust component data collected during operation.

Based on the collected data, the disclosed power system may make a determination, for each monitored component, of a maximum EGR flow rate that may be employed without resulting in the operating limits of the component being exceeded. Once the maximum EGR flow rate is determined for each component, the lowest of the determined maximum EGR flow rates is chosen to ensure that none of the various components are stressed beyond their operating limits.

An exemplary method for exhaust gas recirculation may include regulating, with the EGR valve, the flow of exhaust gases through the EGR flowpath. The method may also include monitoring, with the monitoring system, operating parameters of at least two components of the EGR system. The method may further include determining, with the controller, a maximum flowrate value for each of the at least two components of the EGR system, based on the monitored operating parameters. Each of the maximum flowrate values may represent the maximum EGR flowrate which may be utilized without exceeding a predetermined operating limit of the monitored component with which the respective maximum flowrate value is associated. In addition, the method may include controlling, with the controller, the EGR valve, based on the determined maximum flowrate values, to result in an EGR flowrate no greater than the lowest of the determined maximum flowrate values.

In some embodiments, at least one of the components monitored in the exemplary method may include an air-to-air after cooler and at least one of the monitored operating parameters may include inlet temperature of the air-to-air after cooler. In some embodiments, at least one of the components monitored in the exemplary method may include an exhaust gas recirculation cooler and at least one of the monitored operating parameters may include thermal load on the exhaust gas recirculation cooler. In some embodiments, at least one of the monitored operating parameters may include condensation of gases in the air intake system portion of the EGR system. Some of the monitored operating parameters may be measured directly. However, in some embodiments, at least one of the monitored operating parameters may be determined indirectly based on measurements of other operating parameters. In addition, the determination of the maximum flowrate value for each of the components of the EGR system may take into consideration other power system operating conditions.

It will be apparent to those having ordinary skill in the art that various modifications and variations can be made to the disclosed exhaust gas recirculation system without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. A power system, comprising:

an exhaust producing engine;

an exhaust system configured to direct exhaust gases produced by the engine away from the engine;

an exhaust gas recirculation system, including:

an exhaust gas recirculation flowpath;

an air intake system of the engine, wherein the exhaust gas recirculation flowpath is configured to route a portion of exhaust gases produced by the engine back to the air intake system; and an exhaust gas recirculation valve configured to regulate the flow of exhaust gases through the exhaust gas recirculation flowpath;

a monitoring system configured to monitor operating parameters of at least two components of the exhaust gas recirculation system; and a controller configured to:

determine, based on the monitored operating parameters, a maximum flowrate value for each of the at least two components of the exhaust gas recirculation system, wherein each of the maximum flowrate values represents the maximum exhaust gas recirculation flowrate that may be utilized without exceeding a predetermined operating limit of the monitored component with which the respective maximum flowrate value is associated; and control the exhaust gas recirculation valve, based on the determined maximum flowrate values, to result in an exhaust gas recirculation flowrate no greater than the lowest of the determined maximum flowrate values.

2. The power system of claim 1, wherein the at least two components include an air-to-air after cooler and at least one of the monitored operating parameters includes inlet temperature of the air-to-air after cooler.

3. The power system of claim 1, wherein the at least two components include an exhaust gas recirculation cooler and at least one of the monitored operating parameters includes thermal load on the exhaust gas recirculation cooler, wherein thermal load is an assessment of the amount of thermal energy carried by the exhaust gas recirculation relative to the cooling capacity of the exhaust gas recirculation cooler.

4. The power system of claim 1, wherein at least one of the monitored operating parameters is determined indirectly based on measurements of other operating parameters.

5. The power system of claim 1, wherein the determination of the maximum flowrate value for each of the at least two components of the exhaust gas recirculation system takes into consideration other power system operating conditions.

6. The power system of claim 1, wherein at least one of the monitored operating parameters includes condensation of gases in the exhaust gas recirculation system.

7. The power system of claim 6, wherein the condensation of gases is monitored in the air intake system portion of the exhaust gas recirculation system.

8. A method for exhaust gas recirculation, comprising:

directing exhaust gases produced by an engine away from the engine with an exhaust system, wherein the engine is part of a power system including:

the engine;

the exhaust system;

an exhaust gas recirculation system, including:

an exhaust gas recirculation flowpath;

an air intake system of the engine, wherein the exhaust gas recirculation flowpath is configured to route a portion of exhaust gases produced by the engine back to the air intake system; and an exhaust gas recirculation valve configured to regulate the flow of exhaust gases through the exhaust gas recirculation flowpath;

a monitoring system; and a controller;

recirculating, with the exhaust gas recirculation system, a portion of exhaust gases produced by the engine back to the air intake system via the exhaust gas recirculation flowpath;

regulating, with the exhaust gas recirculation valve, the flow of exhaust gases through the exhaust gas recirculation flowpath;

monitoring, with the monitoring system, operating parameters of at least two components of the exhaust gas recirculation system;

determining, with the controller, a maximum flowrate value for each of the at least two components of the exhaust gas recirculation system, based on the monitored operating parameters, wherein each of the maximum flowrate values represents the maximum exhaust gas recirculation flowrate which may be utilized without exceeding a predetermined operating limit of the monitored component with which the respective maximum flowrate value is associated; and controlling, with the controller, the exhaust gas recirculation valve, based on the determined maximum flowrate values; to result in an exhaust gas recirculation flowrate no greater than the lowest of the determined maximum flowrate values.

9. The method of claim 8, wherein the at least two components include an air-to-air after cooler and at least one of the monitored operating parameters includes inlet temperature of the air-to-air after cooler.

10. The method of claim 8, wherein the at least two components include an exhaust gas recirculation cooler and at least one of the monitored operating parameters includes thermal load on the exhaust gas recirculation cooler, wherein thermal load is an assessment of the amount of thermal energy carried by the exhaust gas recirculation relative to the cooling capacity of the exhaust gas recirculation cooler.

11. The method of claim 8, wherein at least one of the monitored operating parameters is determined indirectly based on measurements of other operating parameters.

12. The method of claim 8, wherein the determination of the maximum flowrate value for each of the at least two components of the exhaust gas recirculation system takes into consideration other power system operating conditions.

13. The method of claim 8, wherein at least one of the monitored operating parameters includes condensation of gases in the exhaust gas recirculation system.

14. The method of claim 13, wherein the condensation of gases is monitored in the air intake system portion of the exhaust gas recirculation system.

15. A machine, comprising:

a frame; and a power system, including:

an exhaust producing engine connected to the frame;

an exhaust system configured to direct exhaust gases produced by the engine away from the engine;

an exhaust gas recirculation system, including:

an exhaust gas recirculation flowpath configured to route a portion of exhaust gases produced by the engine back to an air intake system of the engine; and an exhaust gas recirculation valve configured to regulate the flow of exhaust gases through the exhaust gas recirculation flowpath;

a monitoring system configured to monitor operating parameters of at least two components of the power system; and a controller configured to:

determine, based on the monitored operating parameters, a maximum flowrate value for each of the at least two components of the power system, wherein each of the maximum flowrate values represents the maximum exhaust gas recirculation flowrate which may be utilized without exceeding a predetermined operating limit of the monitored component with which the respective maximum flowrate value is associated; and control the exhaust gas recirculation valve, based on the determined maximum flowrate values, to result in an exhaust gas recirculation flowrate no greater than the lowest of the determined maximum flowrate values.

16. The machine of claim 15, wherein the at least two components include an air-to-air after cooler and at least one of the monitored operating parameters includes inlet temperature of the air-to-air after cooler.

17. The machine of claim 15, wherein the at least two components include an exhaust gas recirculation cooler and at least one of the monitored operating parameters includes thermal load on the exhaust gas recirculation cooler temperature, wherein thermal load is an assessment of the amount of thermal energy carried by the exhaust gas recirculation relative to the cooling capacity of the exhaust gas recirculation cooler.

18. The machine of claim 15, wherein at least one of the monitored operating parameters is determined indirectly based on measurements of other operating parameters.

19. The machine of claim 15, wherein at least one of the monitored operating parameters includes condensation of gases in the exhaust gas recirculation flowpath.

20. The machine of claim 19, wherein the condensation of gases is monitored in the air intake system portion of the exhaust gas recirculation system.

* * * * *